June 2, 1959 L. STASCHOVER 2,889,516

SINGLE CHANNEL FREQUENCY RESOLVER

Filed Dec. 12, 1956 4 Sheets-Sheet 1

INVENTOR.
LEO STASCHOVER

BY Leonard H. King

AGENT $K = 36.6 \times 10^{-8} F_{C.O.}$ °/FT.
$F_{C.O.}$ = WAVEGUIDE CUTOFF FREQUENCY IN C.P.S.
$f = \frac{f}{F_{C.O.}}$ INVENTOR.
LEO STASCHOVER
BY
Leonard H. King
AGENT INVENTOR.
LEO STASCHOVER
BY
Leonard H. King
AGENT June 2, 1959 L. STASCHOVER 2,889,516

SINGLE CHANNEL FREQUENCY RESOLVER

Filed Dec. 12, 1956 4 Sheets-Sheet 4

INVENTOR.
LEO STASCHOVER

BY Leonard H. King

AGENT 2,889,516

SINGLE CHANNEL FREQUENCY RESOLVER

Leo Staschover, New York, N.Y., assignor to Sterling Precision Corp., Flushing, N.Y.

Application December 12, 1956, Serial No. 627,888

10 Claims. (Cl. 324—82)

This invention relates to a system for the determination of unknown frequencies in a signal receiving system and more particularly to the instantaneous frequency indication, upon reception, of single pulse signals of very short time duration.

A military application of this invention is as a countermeasure receiver for the detection of enemy radar signals.

Present methods and means for the determination of the frequency components of unknown signals are conventional and well known. However, where the signal envelope takes on the form of a low duty cycle pulse, and where only one or a small number of pulses are received at long time intervals, both the power and time elements become critical factors.

Generally, the major problems in mono-pulse frequency measuring apparatus are the design of automatic means for frequency discrimination and the assurance of accurate indications over a reasonable range of input signal levels. It is also necessary in such means to provide an indicating device having some degree of memory in order to store frequency information for a sufficient length of time to permit the necessary data processing.

In the well known method of frequency discrimination by the actual separation of signals in terms of frequency, the spectrum region of interest is divided into discrete channels, each employing a separate receiving system. Under certain conditions, sections of some or all channels may be made common to effect some economy of equipment. However, in the absence of other complicated circuit arrangements, frequency separation is not completely effected; the result being that signals of the same frequency may appear in one or both adjacent channels because of overlapping channel responses required to avoid appearances of holes in the frequency spectrum. Maximum resolution is a function of bandwidth, and the dynamic range characteristic of the system is necessarily limited by the cross-modulation effects of the common circuitry of the various channels and the skirt selectivities of the filter circuits defining band-passes. In another class of systems for frequency determination, received signals are in effect not separated in terms of frequency, but are processed instead by common circuitry. Frequency discrimination is then achieved by means of a network which operates on the input signal in such a manner so as to permit retention of signal frequency information after simple amplitude detection. Frequency information, may, for example, be contained in the ratio of two discriminator output voltages. In practice the dynamic operating range of input signals is specified, and the ratio information must be preserved in the course of amplifying the signal outputs in separate channels. The accuracy of such systems is highly dependent upon the degree to which the detectors and amplifiers are identical and linear, and the dynamic range over which the display circuitry can adequately operate. Further, the dynamic range requirements cannot be reduced by signal limiting in the amplifiers or else the ratio information would be lost.

Therefore, it is an object of this invention to provide an improved system for frequency separation and indication from an unknown signal.

Another object of this invention is to provide a signal frequency separation system which does not depend critically on the amplitude of the received signal over a large dynamic range.

A still further object of this invention is to provide a frequency separation system which eliminates the need for linear and balanced detectors and amplifiers.

And still a further object of the invention is to provide frequency indicating apparatus for instantaneous frequency indication upon reception of a single signal pulse of very short duration.

Other objects and advantages will become apparent from a study of the specifications herein and the accompanying drawings and wherein.

Figure 4:
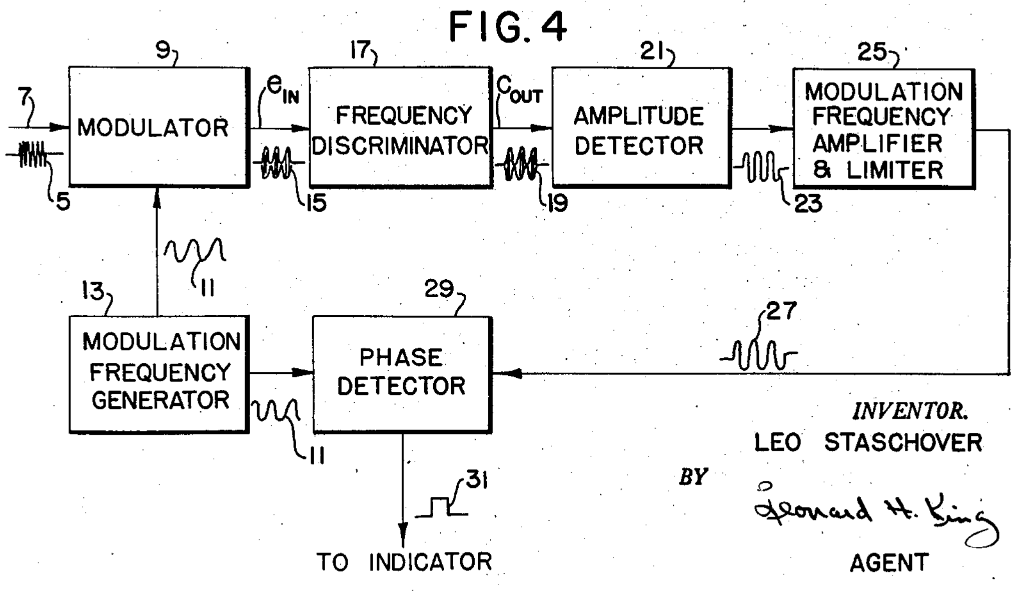
Fig. 4 shows a block diagram of a system for frequency separation and indication according to the invenherein disclosed.

In general the invention as contemplated herein and illustrated in Fig. 4 involves the amplitude modulation of the received signal pulses at a frequency sufficiently high to produce many modulation cycles during the pulse width. A microwave network following the modulator serves to phase-shift the modulation envelope as a unique function of carrier frequency which envelope is then detected. The detected modulation envelope is amplified and amplitude limited and compared with a reference signal in a phase detector, thus yielding complete carrier frequency information.

Figure 1:
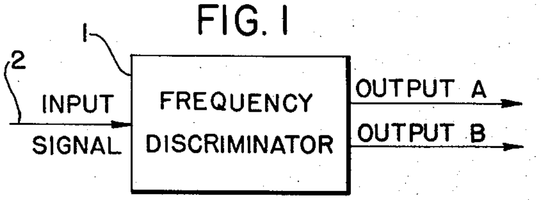
Figs. 1 and 1A show in block form a dual output type of frequency discriminator and its output characteristics.
Figure 1A:
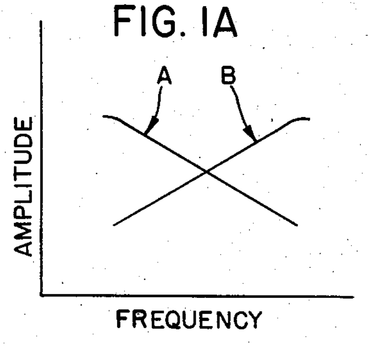

Referring now to Figs. 1 and 1A there is shown a basic frequency discriminator 1 in block form, having an input 2 and output A and B. The outputs A and B vary in opposite directions with frequency illustrated by termined by the signal frequency regardless of input signal level. Evidently, if the input level were held constant at a particular value, the amplitude of either A or B alone would bear complete frequency information. This basic type of discriminator has, as previously expressed, severe problems of balanced linearity and display over a large dynamic range.

One method for producing a phase shift network is as follows:

A carrier frequency $F_c$ is sinusoidally amplitude modulated at a frequency $f_m$ and the modulated signal $e_{in}$ applied to a passive transmission network of arbitrary phase Bs frequency characteristic, and designated as "input signal" in Fig. 1. The output voltage $e_{out}$ may be found to be:

$$e_{out}=\cos\left(2\pi Fct+\phi_c\right)M_{\cos}\left(2\pi fmt+\frac{\phi_u-\phi_L}{2}\right)\cos\left(2\pi Fct+\frac{\phi_u+\phi_L}{2}\right)$$

Figure 2:
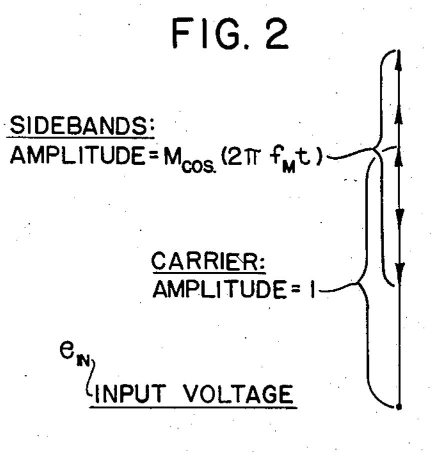
Figs. 2 and 3 illustrate phasor diagrams of input and output voltages of a phase shift network.
Figure 3:
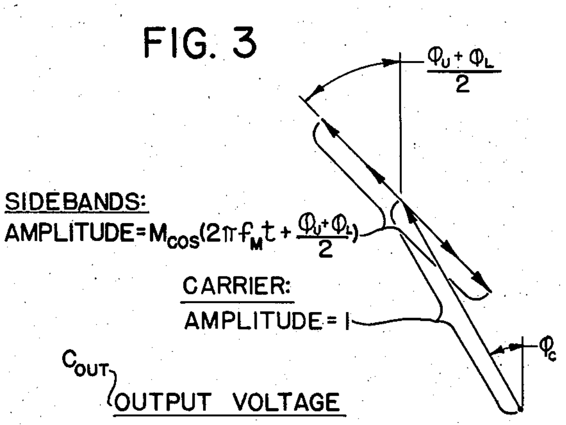

The phasor diagrams of Figs. 2 and 3 show the phase relationships between $e_{in}$ and $e_{out}$. The wave envelope of the output voltage $e_{out}$ is phase shifted with respect to the input voltage $e_{in}$ by an angle $$\Delta\phi=\frac{\phi_u-\phi_L}{2}$$

where $\phi_c$, $\phi_u$ and $\phi_L$ are the phase shifts at the carrier, upper sideband, and lower side-band frequencies respectively.

One may also express this angle as $$\phi\frac{d\phi}{dt}\times fm$$

where $$\frac{d\phi}{dt}$$

is the slope of the phase V frequency characteristic of the network at the point between $Fc-fm$ and $Fc+fm$ where the tangent to the curve is parallel to the straight line through point $\phi_u$ and $\phi_L$. If the phase curve is assumed to be linear between these two points, then a network having a phase characteristic of monotonically varying slope over the frequency band of interest may thus serve to code, carrier frequency information in the envelope of the radio frequency wave, information which is retained after simple amplitude detection. However, two bits of data are still required to uniquely specify carrier frequency. In addition to the envelope phase of the network output signal, reference phase information corresponding to the original modulating signal must be provided. Fortunately, signal amplitude is of no concern and reference phase data is readily derived from the modulating source. Thus, only a single channel of amplification is required to step up the network output signal to the level necessary for phase comparison and the problem of delicate matching of components in companion channels is eliminated.

A system according to the invention herein is shown in Fig. 4, and operates generally as follows: a pulsed carrier input signal 5 is first passed to the input 7 of modulator 9 which amplitude modulates the input signal at a sufficiently high rate to assure an adequate number of detected cycles to establish a phase relationship with respect to the modulating source. For example, a 100 megacycle modulation frequency would provide 25 cycles of detected 100 megacycle signal for a 14 microsecond pulse. The modulation signal 11 is provided from a modulation frequency generator source 13. The modulated pulsed signal 15 is then applied to a frequency discriminator network 17 having phase and phase-slope characteristics shown in idealized form in Fig. 5. In the frequency band of interest, the phase function possesses a linearly varying slope, whereas above and below this band the phase characteristic has a constant slope. The envelope of the carrier is thus shifted with respect to the modulating voltage by some given angle, dependent on the carrier frequency.

The discriminator output signal 19 is demodulated by an amplitude detector 21 and the resulting output, bursts of modulation frequency signals 23, are amplified by a combination multistage amplifier and limiter 25, capable of handling the dynamic range requirements of the system. The resulting output signal 27 is essentially constant in amplitude, and independent of input signal level over the prescribed range. This signal 27 is then transmitted to the input of phase detector 29 which detector compares the phase of signals 27 and 11, the signal 11 being produced by the modulation frequency generator 13. The resulting signal output 31, from phase detector 29, is a signal pulse of amplitude and polarity resulting from and dependent upon the phase difference of signals 11 and 27.

Figure 5:
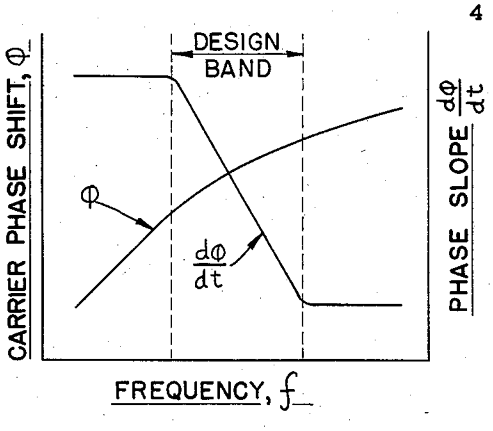
Fig. 5 shows an idealized phase and phase-slope characteristic of a microwave discriminator network.
Figure 6:
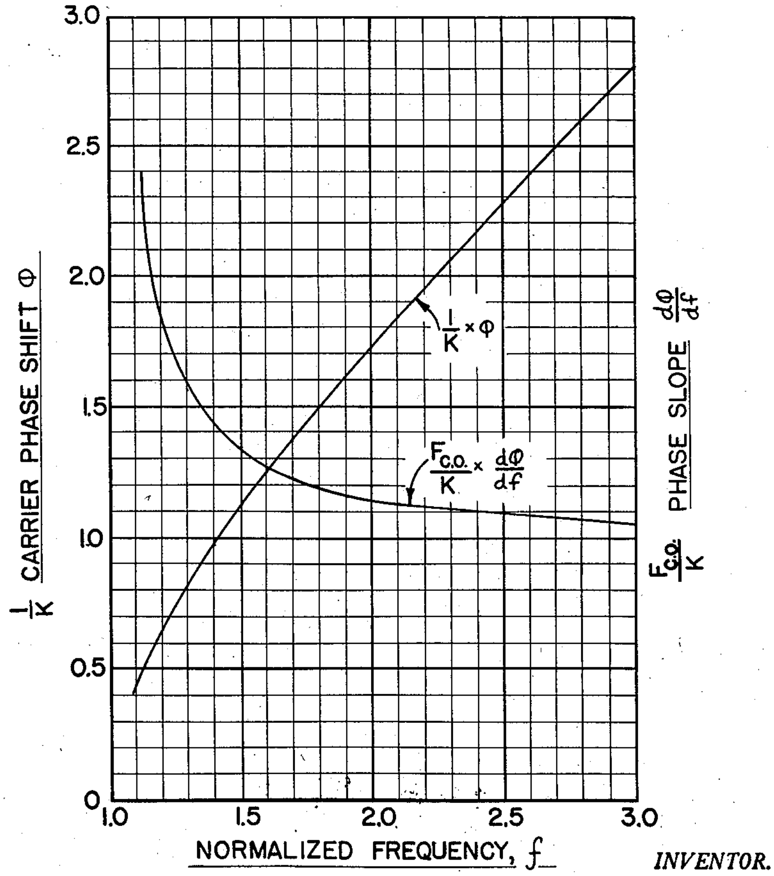
Fig. 6 shows phase and phase-slope characteristic of microwave discriminators.
Figure 7:
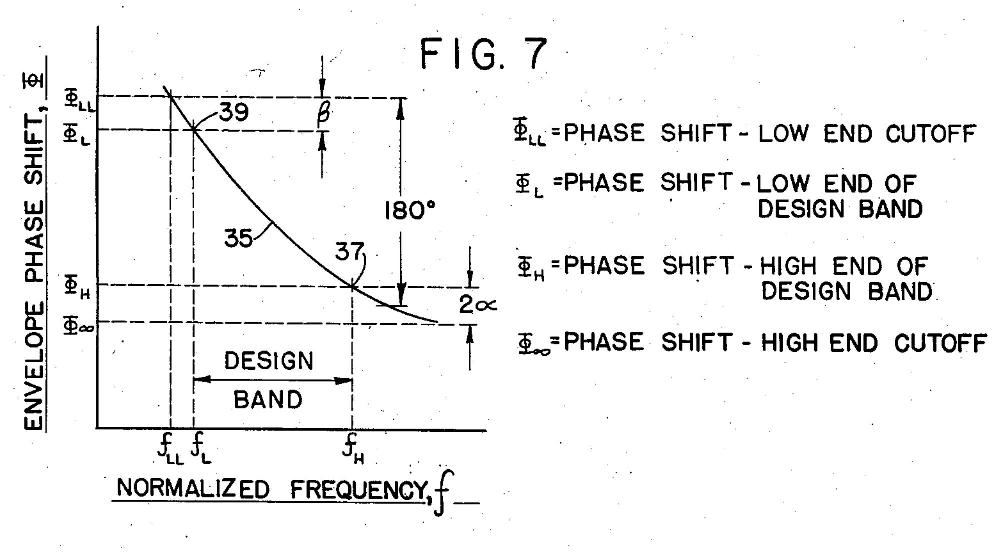
Fig. 7 shows the determination of operating limits along the envelope phase shift characteristic of a microwave discriminator.

Referring to Fig. 4, it was shown that the modulated signal 15 was shifted in phase, that is the wave envelope of the carrier with respect to the modulating voltage was shifted by some given angle, depending upon carrier frequency. Apparatus capable of producing these types of phase shifts are rectangular wave guides of fixed lengths and usable as a frequency discriminator network. Fig. 5 shows characteristic response curves for a given length of rectangular wave-guide showing the phase-shift of the envelope for a given modulation frequency. The working range along the phase shift wave 33 of Fig. 6 is determined by factors illustrated in Fig. 7, the phase shifts at the upper and lower frequencies of the design band being indicated along curve 35 at points 37 and 39 respectively.

Figure 8:
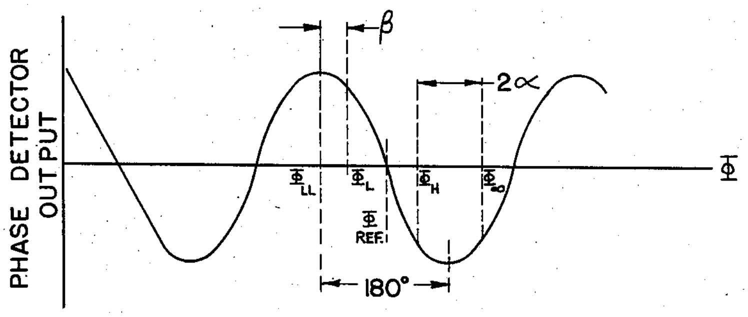
Fig. 8 shows a typical type of phase detector characteristic.

Ordinary phase detectors have peak to peak ranges of 180 degrees and are cylically repetitive on both sides as illustrated in Fig. 8. Generally, to avoid ambiguities in the design band, the difference in phase shift between the lower and upper portion of the design band should be equal to or less than 180 degrees. Where the difference is equal to 180 degrees, the reference phase should be adjusted to set the phase angle at the lower end of the design band at one peak of the detector curve and the phase angle at the upper end of the design band at the other end of the detector peak curve. But such adjustments result in spurious indications because of frequencies immediately below and above the design band. To eliminate such spurious indications, a short section of waveguide, of a cut-off frequency slightly below the lower limit of the design band, may be placed ahead of the modulator.

Figure 9:
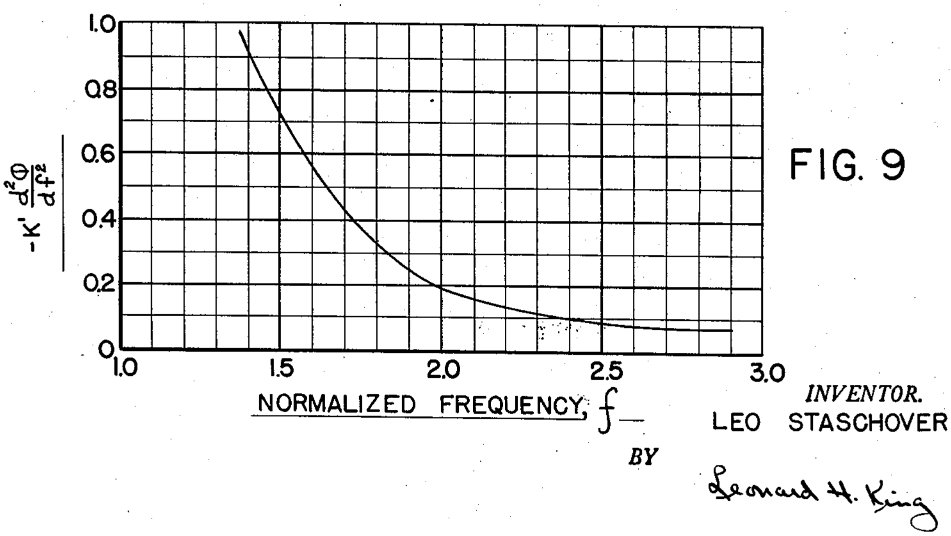
Fig. 9 shows the derivative of the phase-slope characteristic with respect to frequency as a function of normalized frequency.

The difficulty with the phase-slope characteristic of rectangular waveguides is lack of linearity with frequency. In the case of the ideal network capable of producing the characteristics shown in Fig. 5, the derivative of such characteristics function with frequency over the design band is a constant. However, rectangular waveguides possess a phase-slope function derivative similar to that shown in Fig. 9. For a specific design band, the selection of frequencies at the upper and lower ends of band involves a compromise between a practical length of waveguide section and permissible variation in frequency sensitivity. By extending the lower frequency end of the design band upward, frequency linearity is improved, but at the expense of having to provide longer guide lengths.

Figures 10, 11, 12, 13:
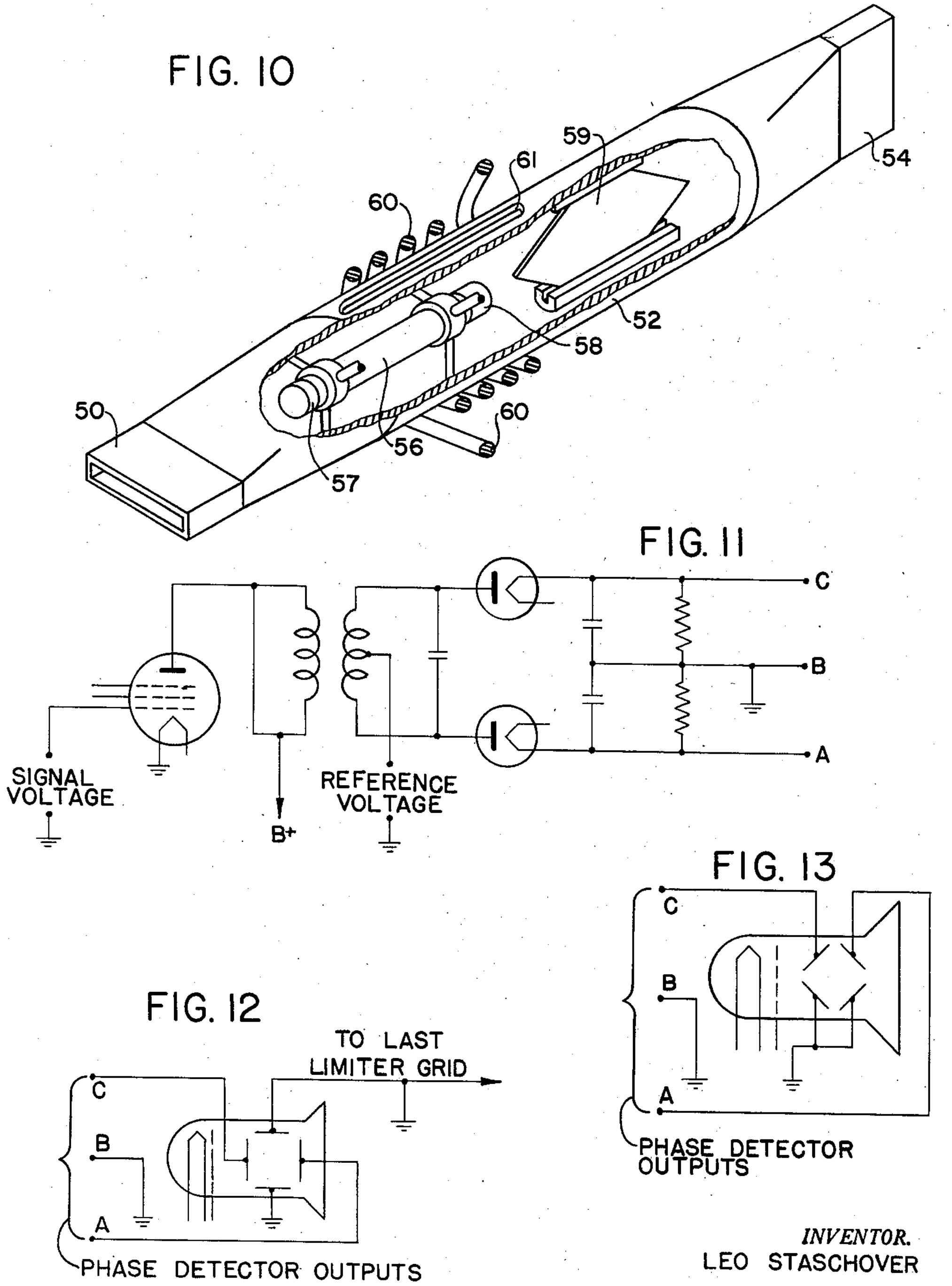
Fig. 10 shows a waveguide structure useful as a high frequency broadband microwave modulator.
Fig. 11 is a schematic of a typical type of phase detector operating at the modulation frequencies herein.
Fig. 12 is a schematic of a cathode ray tube display utilizing the sum of phase detector output voltages.
Fig. 13 is a schematic of a cathode ray tube display utilizing the rate of phase detector output voltages.

Referring to Fig. 10 there is shown a microwave modulator useful in the novel system as disclosed herein. The modulator must be essentially a four terminal microwave structure capable of amplitude modulating the radio frequency energy at rates in the order of 25 to 100 megacycles. The structure should be electrically short, and operate satisfactorily, with respect to impedance match, insertion loss and modulation percentage, over large frequency bands. The requirement of small electrical length is necessary to prevent the phase-frequency characteristic of the modulator from contributing appreciably to the performance of the frequency discrimination network. It is preferable that the modulation be at least 90 percent in power, input VSWR under 1.5, and the insertion loss be less than 1 db over at least 50 percent of the band.

These considerations are met by providing a microwave modulator wherein polarization rotation by ferrites in round waveguides is effected, as shown by the said Fig. 10. The rectangular waevguide 50 from the antenna undergoes a transition from rectangular into a circular waveguide 52 of such size that only the lowest mode will propagate. At the end of this short length of circular guide is another transition, wherein the circular guide transforms back into a rectangular guide 54. However, the rectangular guide 54 is oriented at right angles to the input rectangular guide 50. In the circular section 52 there is a centrally located small diameter ferrite rod 56 with matching sections 57, 58 at its extremities, followed by a length of resistance card 59 placed parallel to the electric field in the input line. An exciting coil 60 consisting of a few widely separated turns of heavy gage wire is axially placed around the circular guide. The circular guide may preferably have a brass wall, in which case an axially oriented shielded slot 61 is cut in the wall and a thin Teflon layer placed between the guide and the coil, or in the alternative, there may be employed a dielectric cylinder having a very thin metallic layer on the inner surface. Either method eliminates a shorted turn (the waveguide) from being coupled to the coil. This modulator is described in the concurrently filed application of Richard D. Bogner entitled "Modulator."

This construction, as shown in Fig. 10, allows large modulations over wide frequency bands, so that for a fixed exciting current, variations of polarization rotation with frequency are considerably reduced. With zero exciting current, the energy leaves the ferrite section polarized parallel to the resistance card and normal to the dominant mode of the output waveguide, so that the power coupled to the output is in the order of 40 db below the input power over the design frequency band. The attenuation through the unit approaches zero at a particular frequency as the current reaches the proper value to cause 90 degree polarization rotation. As the frequency varies, the rotation angle will deviate from 90 degrees, although for the proper combination of parameters this deviation can be kept relatively small. If the current is so chosen that over the band the rotation angle excursion is an equal amount on either side of 90 degrees, this deviation can be as large as plus or minus 45 degrees to maintain the insertion loss less than 3 db. Modulation rates of the desired order can be achieved by the proper choice of ferrite length, diameters, exciting coil and associated modulation circuitry. The coil 60 is part of a conventional circuit tuned to resonance at the modulation frequency, thereby allowing a relative small power supply and output tube to be used in spite of the high coil current required.

Another method for radio frequency modulation makes use of traveling wave tubes. A structure of this type is capable of high modulation percentages over broad bands at the desired rates and offers the additional advantages of signal amplification and completed development for some bands.

In Fig. 4, showing the system for frequency indication, the amplitude detector 21 can be of any of the standard types of microwave detectors to demodulate the radio frequency signal derived from the frequency discriminator network. A crystal detector may be operated in the usual manner except that its output capacitance may be tuned out by making it part of a tuned circuit resonant at the modulation frequency.

The combination amplifier and limiter 25 of Fig. 4 can be of the type commonly used for intermediate frequency amplification in FM systems, with the proviso that detuning as a function of amplitude must be minimized to avoid spurious signal phase shifts, and signal limiting must be effective over the specified dynamic range.

Fig. 11 shows a typical phase detector 29 usable with the system shown in Fig. 4. The circuit is of the conventional bridge type, requiring careful balancing of bypass and stray capacitances as the detected signal output consists of short-duration pulses rather than low frequency sine-waves. If the limiter circuits of the amplifier 25 in Fig. 4 were to operate in an ideal manner, furnishing a constant amplitude peak current to the phase detector irrespective of received signal level, a single output voltage, across terminals A and C of Fig. 11, would specify completely the received radio frequency in terms of pulse amplitude and polarity. In carrying out the invention, one may also employ a crystal detector.

A convenient display method applicable in this case is illustrated in Fig. 12, whereby the respective terminal inputs, A, B and C are comparable to terminal outputs of the detector shown in Fig. 10, and fed by same. The beam of a cathode ray tube is deflected upward by a constant displacement whenever a signal pulse is received, and a distance in the horizontal direction, proportional to the phase detector output signal, dependent on frequency. Fig. 13, shows an alternate display method where limited performance falls short of the desired tolerances. The ratio of output voltages across terminals BA and BC respectively rather than their difference is used as an indication of frequency. The voltages are applied respectively to the vertical and horizontal plates of the cathode ray tube in Fig. 13 and the tube oriented so that a vertical deflection is produced when the respective output voltages are equal. A sector display thus results, the limits depending on the maximum phase deviations accepted by the phase detector.

It may be concluded that the single channel frequency resolver system herein disclosed accomplishes instantaneous frequency indication without depending critically on the amplitude of the received signal over a large dynamic range, and detector characteristics may vary widely without affecting system performance since operation in the square law region of the detector is a requirement. The system has inherent discrimination against indication of received frequencies outside the design band without the need for additional preselection, and sensitivity above normal crystal video levels may be achieved by both crystal video, operation in the square law region not being required, and the shift of the detection band from video to VHF frequencies.

Having described the invention, what is claimed is:

1. A system for the instantaneous frequency indication of an unknown signal in a given frequency range comprising: a modulation frequency generator capable of producing frequency signals of a first frequency in an output circuit; a modulator having an input circuit coupled to said modulation frequency generator so as to receive said first frequency signals and means to receive said unknown signals and adapted to produce a modulated wave envelope in an output circuit; a phase-shift network characterized by a monotonically varying slope, provided with an input circuit coupled to said last named output circuit, adapted to receive said wave envelope to produce a phase shift thereof with respect to its initial phase thereby coding carrier information in said wave envelope, and to present the resulting phase shifted wave envelope in an output circuit; an amplitude detector coupled to said last named output circuit adapted to receive the phase shifted envelope to produce in an output circuit, a signal having said coded carrier frequency information; means coupled to said last named output circuit, for amplifying and limiting said coded carrier frequency bearing signal so as to provide in an output circuit a constant amplitude coded signal which is constant in amplitude and independent of input signal level over the prescribed range; and a phase detector, having a pair of input circuits, one of said input circuits being coupled to said last named output circuit so as to receive said coded carrier frequency bearing signals and the other of said input circuits being coupled to said output circuit of said modulation frequency generator, whereby said signal of a first frequency and said constant amplitude coded signal are compared in phase, in said phase detector, to produce a resulting output signal indicative of the frequency of the unknown input signal.

2. A system for the instantaneous frequency indication of signals of unknown frequency in a given frequency range comprising: a modulation frequency generator provided with an output circuit capable of producing signals of greater frequency than that of said signals of unknown frequency; an AM four terminal type modulator coupled to the output of said modulation frequency generator; means coupled to said modulator for introducing therein said signals of unknown frequency; said modulator having an output circuit adapted to transmit a resulting modulated wave envelope; a phase shift frequency discriminator type network having a monotonically varying slope coupled to said modulator so as to receive said wave envelope and to produce a phase shift thereof with respect to its initial phase thereby coding carrier information in said wave envelope, an AM type detector coupled to said network so as to receive the phase shifted envelope and adapted to produce a signal having said coded carrier frequency information; means coupled to the said detector adapted to receive, amplify and limit said coded carrier frequency bearing signal, so as to provide a signal constant in amplitude and independent of input signal level over the prescribed range; a phase detector having a pair of inputs, one of said inputs being coupled to said last named means so as to receive said coded carrier frequency bearing signals and the other of said inputs being adapted to receive the said signals of unknown frequency and wherein the said signals are compared in phase in said phase detector to produce a resulting output signal indicative of the frequency of the unknown input signal.

3. The system of claim 2 including an indicator device coupled to said phase detector for visually displaying the said resulting output signal representative of the frequency of said unknown signal.

4. The system of claim 3 wherein said indicator device is a cathode ray tube device for visually displaying the resulting output signal, the deflection of the said cathode ray being representative of the unknown frequency microwave signals and wherein the said input signals are compared in phase in said phase detector to produce a resulting output indicative of the frequency of the unknown input signal.

5. The system of claim 4 wherein said indicating device is a cathode ray tube device for visually displaying the resulting output signal, circuit means connecting one set of cathode ray deflection means so as to display said unknown signal by causing a deflection of the said cathode ray in one direction and circuit means coupled to said phase detector and another set of cathode ray deflection means to cause a deflection of said cathode ray in a direction at right angles to said one direction thereby presenting a display indicative of the frequency of the unknown signal.

6. A system for the instantaneous frequency indication of an unknown signal in a given microwave frequency range comprising, a modulation frequency generator capable of producing frequency signals having a frequency higher than that of said unknown signal; a microwave wave guide type modulator provided with means to receive said unknown signals and coupled to said modulation frequency generator and arranged to produce a modulated wave envelope in an output circuit; a phase shift microwave frequency discriminator type network having a monotonically varying slope connected to said last named output circuit so as to receive said wave envelope and to produce a phase shift thereof with respect to its initial phase, thereby coding carrier frequency information in said wave envelope; means coupled to said network adapted to receive, amplify and limit said coded carrier frequency bearing signal, so as to produce in an output circuit a signal constant in amplitude and independent of input signal level over the prescribed range; a phase detector having a pair of inputs, one of said inputs being coupled to said last named means so as to receive said coded carrier frequency bearing signals and the other of said inputs adapted to receive the said unknown signals and wherein the said signals are compared in phase, in said phase detector, to produce a resulting output signal indicative of the frequency of the unknown input signal.

7. The apparatus of claim 6 wherein said wave guide type modulator is of the type employing a ferrite element for polarization rotation of the signal.

8. The system of claim 7 wherein said wave guide microwave modulator comprises a pair of rectangular end sections oriented at right angles to each other, a circular central section and a transition section intermediate each of said end sections and the said circular central section to effect proper matching.

9. A system according to claim 8 wherein said central circular section has mounted therein a centrally located ferrite rod provided with impedance matching end sections and a length of resistance card oriented in line with said ferrite rod.

10. A system according to claim 8 wherein said central circular section is provided with an axial slot in its external outer periphery and has disposed about it an exciting coil.

References Cited in the file of this patent

UNITED STATES PATENTS

| | | |
|---|---|---|
| 2,340,432 | Schock | Feb. 1, 1944 |
| 2,351,192 | Crosby | June 13, 1944 |
| 2,482,173 | Hagstrum | Sept. 20, 1949 |
| 2,496,818 | Seeley | Feb. 7, 1950 |
| 2,513,731 | Loughlin | July 4, 1950 |

OTHER REFERENCES

Crosby: Abstract Serial No. 605,128, published August 23, 1949.